United States Patent [19]

Suzuki et al.

[11] Patent Number: 4,816,912
[45] Date of Patent: * Mar. 28, 1989

[54] LASER-BEAM PRINTER WITH IMPROVED OPTICAL DEFLECTOR

[75] Inventors: Makoto Suzuki; Kazunari Taki, both of Nagoya, Japan

[73] Assignee: Brother Kogyo Kabushiki Kaisha, Japan

[*] Notice: The portion of the term of this patent subsequent to Jul. 5, 2005 has been disclaimed.

[21] Appl. No.: 129,392

[22] Filed: Nov. 24, 1987

Related U.S. Application Data

[63] Continuation of Ser. No. 868,574, May 30, 1986, abandoned.

[30] Foreign Application Priority Data

Jun. 8, 1985 [JP] Japan ................... 60-124440

[51] Int. Cl.⁴ .................. H04N 1/22; G02B 5/172
[52] U.S. Cl. .................. 358/300; 346/108; 346/107 R; 350/96.12; 350/96.13; 350/96.14
[58] Field of Search .......... 346/107 R, 108, 160; 358/296, 300, 302; 333/239; 350/96.12, 96.13, 96.14

[56] References Cited

U.S. PATENT DOCUMENTS

| | | |
|---|---|---|
| 3,795,433 | 3/1974 | Channin . |
| 4,070,092 | 1/1978 | Burns . |
| 4,175,827 | 11/1979 | McMahon . |
| 4,348,079 | 9/1982 | Johnson . |
| 4,394,060 | 7/1983 | Verber et al. . |
| 4,413,270 | 11/1983 | Sprague ............... 346/108 X |
| 4,425,023 | 1/1984 | Matsumoto et al. .......... 350/96.14 |
| 4,470,661 | 9/1984 | Matsumoto . |
| 4,478,483 | 10/1984 | Sprague . |
| 4,548,464 | 10/1985 | Auracher et al. . |
| 4,611,883 | 9/1986 | Myer . |
| 4,614,408 | 9/1986 | Mir et al. . |
| 4,637,681 | 1/1987 | Yamamoto et al. . |
| 4,705,346 | 11/1987 | Miyawaki . |
| 4,707,059 | 11/1987 | Ogura et al. . |
| 4,747,090 | 5/1988 | Yamashita et al. . |
| 4,755,036 | 7/1988 | Suzuki et al. ............ 350/96.14 |

FOREIGN PATENT DOCUMENTS

| | | |
|---|---|---|
| 0021510 | 1/1981 | European Pat. Off. . |
| 0021993 | 1/1981 | European Pat. Off. . |
| 0048441 | 3/1982 | European Pat. Off. . |
| 2359797 | 12/1977 | Fed. Rep. of Germany . |
| 3102972 | 11/1981 | Fed. Rep. of Germany . |
| 3443863 | 6/1985 | Fed. Rep. of Germany . |
| 51-8949 | 1/1976 | Japan . |
| 54-150153 | 11/1979 | Japan . |
| 58-125025 | 7/1983 | Japan . |
| 58-147718 | 9/1983 | Japan . |
| 59-204027 | 11/1984 | Japan . |

OTHER PUBLICATIONS

Matsunaga et al., "Optical Waveguide Isolator in Ti-Diffused LiNbO₃", *Optics Communications*, Dec. 1978, vol. 27, No. 3, pp. 361-364.

Tsao et al., "Photodeposition of Ti and Application to Direct Writing of Ti:LiNbO₃ Waveguides", *Appl. Phys. Lett.*, vol. 42, No. 7, 4/83, pp. 559-561.

K. Takizawa, "Electrooptical Fresnel Lens . . . ", *Applied Optics*, vol. 22, No. 16, Aug. 15, 1983, pp. 2468-2473.

*Primary Examiner*—E. A. Goldberg
*Assistant Examiner*—Melissa C. Chin
*Attorney, Agent, or Firm*—Parkhurst, Oliff & Berridge

[57] ABSTRACT

A laser-beam printer having a drum with a photoconductive surface, and an optical system which includes a laser source generating a laser beam and an optical deflector for deflecting the laser beam over a predetermined angular range. The photoconductive drum surface is scanned by a linear sweep of the laser beam and thereby given an electrostatic image pattern to be transferred onto a recording medium. The optical deflector includes a single substrate which has a waveguide formed therein for guiding the laser beam, and a deflector portion provided on the substrate for deflecting the laser beam which is propagated through the waveguide, so as to cause the laser beam to scan or sweep the photoconductive surface of the drum over the predetermined angular range.

12 Claims, 7 Drawing Sheets

LASER-BEAM PRINTER WITH IMPROVED OPTICAL DEFLECTOR

This is a continuation of Ser. No. 868,574 filed May 30, 1986, now abandoned.

BACKGROUND OF THE INVENTION

The present invention relates in general to a laser-beam printer, and more particularly to an optical deflector which uses no mechanical moving parts and which is therefore improved in operating reliability and durability.

There is known a laser-beam printer that uses a laser beam to produce an electrostatic image-forming pattern a line at a time on the photoconductive surface of a drum. Such a laser printer employs an optical system which includes a laser light source for generating a laser beam, and an optical deflector for deflecting the laser beam over a predetermined angular range, so as to linearly sweep or scan the drum with the laser beam in the axial direction of the drum. An example of this type of laser printer is disclosed in Laid-Open Publication No. 51-8948 of Japanese Patent Application. Typically, the optical system utilizes a polygon mirror shown in FIG. 18, or a hologram scanner shown in FIG. 19.

Figure 18:
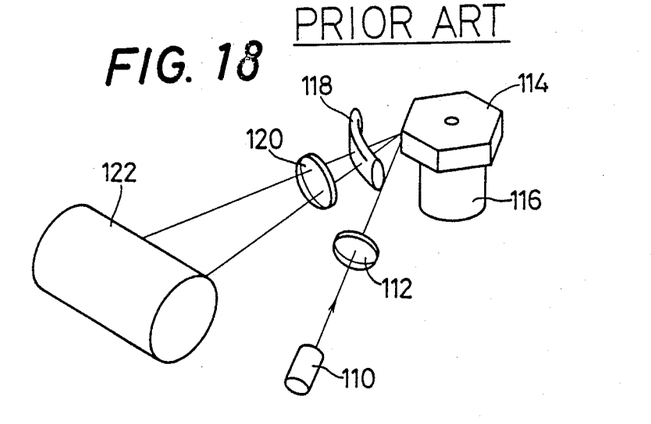
FIGS. 18 and 19 are perspective views showing known types of optical deflectors used for a laser printer.
Figure 19:
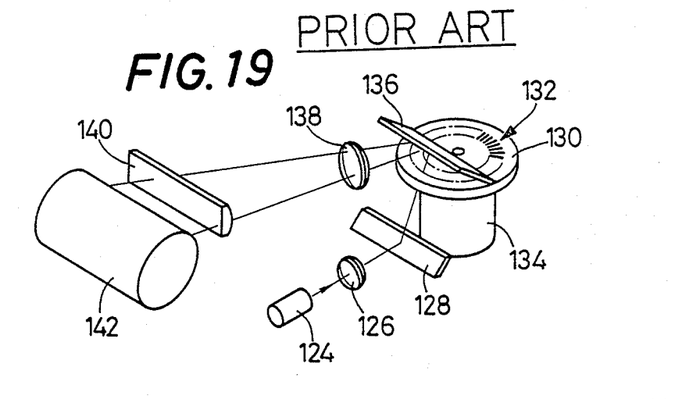

In the optical system shown in a perspective view of FIG. 18, a laser beam emitted by a laser source 110 is transmitted through a collimator lens 112 and is incident upon a polygon mirror 114 which has a plurality of mirror surfaces. The laser beam reflected by the polygon mirror 114 is directed to a photoconductive drum 122 via a troidal lens 118 and an fΘ lens 120. As the polygon mirror 114 is rotated by a motor 116, the laser beam reflected by the mirror 114 is deflected within a predetermined angular range to scan the surface of the photoconductive drum 122. In the optical system shown in a perspective view of FIG. 19, a laser beam produced by a laser source 124 reaches a hologram disc 130 via a cylindrical lens 126 and a stationary mirror 128. The hologram disc 130 has a diffraction grating 132, so that the laser beam reflected by the mirror 128 is passed through the grating 132, and reflected by a mirror 136 disposed over the disc 130. The beam reflected by the mirror 136 arrives at the surface of a photoconductive drum 142 via a spherical lens 138 and a cylindrical lens 140. As the hologram disc 130 is rotated by a motor 134, the angle of diffraction of the diffration grating 132 is varied, and the laser beam incident upon the drum 142 is accordingly deflected over a predetermined angular range, whereby the drum 142 is linearly swept by the laser beam.

As described above, the known optical systems use rotating parts such as a polygon mirror or hologram scanner to deflect a laser beam, motors to drive the rotating parts, and various lens and mirrors. Consequently, the optical systems tend to produce a relatively high level of operating noises, and are not necessarily satisfactory in their operating reliability and durability.

SUMMARY OF THE INVENTION

It is therefore an object of the present invention to provide a laser-beam printer having an improved optical deflector which suffers minimum operating noise, and which is reliable and durable.

According to the present invention, there is provided a laser-beam printer having a drum with a photoconductive surface, and an optical system which includes a laser source generating a laser beam, and an optical deflector for deflecting the laser beam over a predetermined angular range, the photoconductive surface being exposed to a linear sweep of the laser beam and thereby given an electrostatic image pattern to be transferred onto a surface of a recording medium, wherein the optical deflector comprises a single substrate which has a waveguide formed therein for guiding the laser beam generated by the laser source, and a deflector portion provided on the substrate for deflecting the laser beam which is propagated through the waveguide, so as to cause the laser beam to scan or sweep the photoconductive surface of the drum over the predetermined angular range.

In the laser-beam printer of the present invention constructed as described above, the laser beam generated by the laser source is deflected by the optical deflector such that the laser beam guided by the waveguide formed in the substrate is deflected by the deflector portion provided on the substrate. Thus, the optical deflector of the optical system of the instant laser-beam printer does not use any mechanical rotating parts and drives for rotating such parts, which are used in an optical system of the conventional laser-beam printer previously discussed. Accordingly, the optical system of the instant printer is comparatively compact in construction, free of operating noises, and improved in operating reliability and durability.

According to one advantageous feature of the present invention, the optical deflector further comprises a condenser portion provided in the waveguide, and a converging portion having a plurality of mutually spaced-apart convergence electrodes disposed on the waveguide. The condenser portion serves to condense a radiation of the laser beam from the laser source, into parallel rays which are deflected by the deflector portion. The convergence electrodes of the converging portion are disposed so as to converge the deflected parallel rays. The optical system further includes control means comprising a convergence control circuit for applying convergence voltages to the convergence electrodes, such that the convergence voltages are varied as a function of time to adjust a focal length of the converging portion according to an angle of deflection of the parallel rays by the deflector portion, so that the deflected parallel rays are converged on the photoconductive surface of the drum, irrespective of the angle of deflection.

According to one form of the above feature of the invention, the optical deflector further comprises a deflection-amplifying portion disposed between the deflector portion and the converging portion, for amplifying the angle of deflection of the parallel rays by the deflector portion. The deflection-amplifying portion is constituted by a portion of the waveguide whose refractive index is varied so that the portion of the waveguide serves as a concave lens.

In another form of the above feature of the invention, the laser source consists of a semiconductor laser element in the form of a chip.

In a further form of the same feature of the invention, the substrate is made of an electro-optical material having an electro-optical effect, and the deflector portion comprises a plurality of deflection electrodes which are disposed on a portion of the waveguide in spaced-apart relation with each other in a direction intersecting a direction of propagation of the parallel rays through the waveguide. The control means further comprises a deflection control circuit for applying deflection voltages to the deflection electrodes to produce an electric field for establishing a distribution of a refractive index of the portion of the waveguide in a transverse direction of the waveguide. Due to the electro-optical effect of the substrate, the distribution of the refractive index corresponds to a distribution of a magnitude of the electric field. The deflection control circuit is adapted to change the deflection voltages as a function of time, whereby the parallel rays are deflected within the predetermined angular range.

According to a still further form of the advantageous feature of the instant laser-beam printer, the deflector portion comprises an oscillator for generating elastic surface waves to which a portion of the waveguide is exposed, and the control means further comprises a deflection control circuit for changing periodically a frequency of the elastic surfaces waves to effect a periodic variation in refractive index of the portion of the waveguide, in timed relation with the frequency of the elastic waves, whereby an angle of deflection of the parallel rays by the deflector portion is varied with the frequency of the elastic surface waves.

In the above form of the invention, the substrate is made of LiNbO₃, and the oscillator consists of comb-like electrodes disposed on the substrate.

In accordance with yet another form of the printer according to the above-indicated advantageous feature of the invention, the waveguide is formed by a thin layer formed by diffusion of a metallic material through one of opposite surfaces of the substrate. This thin layer for the waveguide has a higher refractive index than the substrate, so as to trap the laser beam within the waveguide in a direction of thickness of the substrate, whereby the laser beam is guided through the waveguide.

Further, the condenser portion may be formed by diffusion of a metallic material through a part of one of opposite surfaces of the substrate which extends across the waveguide, so that the above-indicated part has a refractive index which increases in opposite transverse directions of the waveguide, toward a centerline of the waveguide, so as to provide a convex lens.

Similarly, the deflection-amplifying portion may be formed by diffusion of a metallic material through a part of one of opposite surfaces of the substrate which is located between the condenser portion and the converging portion and which extends across the waveguide. In this case, the above-indicated part of the substrate has a refractive index which decreases in opposite transverse directions of the waveguide, toward a centerline of the waveguide, so as to provide a concave lens.

In a still further form of the printer having the converging portion, the substrate is made of an electro-optical material having an electro-optical effect, and the converging portion comprises a radial array of a plurality of three-dimensional waveguides which are disposed radially so as to cover the predetermined angular range. The convergence electrodes are arranged such that portions of the three-dimensional waveguides are exposed to electric fields which are produced by the convergence electrodes by application of the convergence voltages thereto. The convergence voltages are varied to change magnitudes of the electric fields and thereby change distributions of refractive indexes of the portions of the three-dimensional waveguides through the electro-optical effect, whereby the parallel rays emitted from the three-dimensional waveguides are focused on the photoconductive surface of the drum.

BRIEF DESCRIPTION OF THE DRAWINGS

The above and other objects, features and advantages of the present invention will become more apparent from reading the following detailed description of preferred embodiments of the invention, when considered in connection with the accompanying drawings, in which.

DETAILED DESCRIPTION OF THE PREFERRED EMBODIMENTS

To further clarify the concept of the present invention, the embodiments of the invention will be described in detail, by reference to the accompanying drawings.

Figure 1:
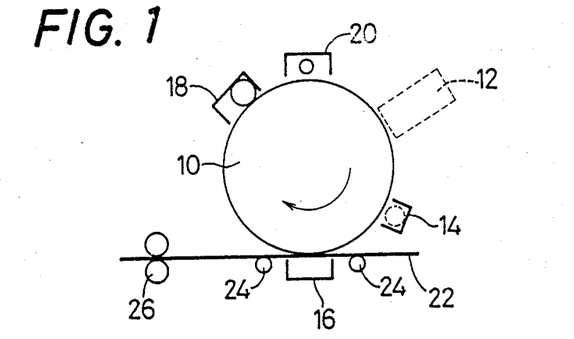
FIG. 1 is a schematic elevational view of one embodiment of a laser-beam printer of the present invention.
Figure 2:
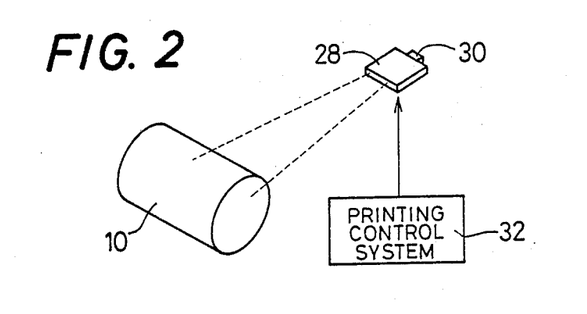
FIG. 2 is a perspective view illustrating an optical system having an optical deflector, used in the laser printer of FIG. 1.

Referring first to FIGS. 1 and 2, there is illustrated a part of a laser-beam printer (hereinafter referred to as a "laser printer"), which includes a drum 10 which is rotated in one direction, and an array of an optical system 12, a developing device 14, a transferring device 16, a cleaner 18 and a corona charging device 20, which are disposed in the order of description along the circumference of the drum 10. A recording medium 22 in the form of a sheet or web is fed between the drum 10 and the transferring device 16, and advanced to a fixing device 26, while being guided by guide rollers 24. The drum 10 is basically comprised of an electrically conductive support, a photoconductive layer and an insulating layer.

As the drum 10 is rotated, its circumferential photoconductive surface is electrically charged by the corona charging device 20 after the surface is cleaned by the cleaner to remove a latent image formed by a toner remaining on the surface. The charged area of the photoconductive surface past the discharging device 20 is subsequently exposed to a laser beam which is generated by the optical system 12. As described later in detail, the optical system 12 is adapted such that the laser beam emitted therefrom is deflected over a predetermined angular range so as to linearly sweep or scan the surface of the drum 10 in the axial direction. As a result, an electrostatic image pattern is formed in a line on the photoconductive surface of the drum 10, due to a difference in electric potential between the areas or spots exposed to the laser beam and the non-exposed areas or spots. Then, the above-indicated toner is applied by the developing device 14, to selected areas on the photoconductive surface according to the formed electrostatic image pattern. The image pattern formed by the toner adhering to the drum 10 is subsequently transferred by the transferring device onto the recording surface of the recording medium 22. The image pattern of the toner on the medium 22 is fixed thereon by the fixing device 26 disposed upstream of the drum 10, whereby the image produced on the photoconductive surface of the drum 10 by means of the linear sweep or scanning by the laser beam from the optical system 12 is reproduced on the recording medium 22.

Figure 3:
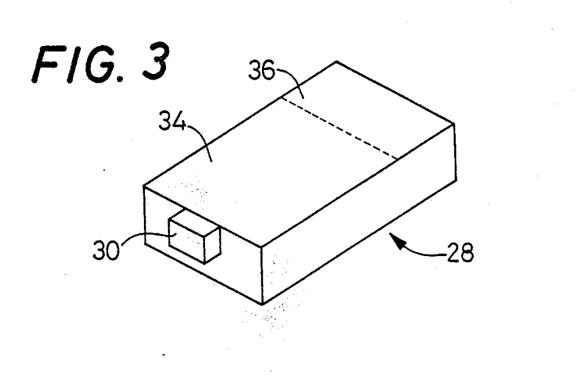
FIG. 3 is a perspective view of the optical deflector of FIG. 2.

The optical system 12, which is generally indicated in FIG. 1, includes an optical deflector 28, a semiconductor laser element 30 which is provided in the form of a chip integral with the deflector 28 to generate a laser beam, and a printing control system 32 for controlling the operations of the optical deflector 28 and the laser element 30, as indicated in FIG. 2. The optical deflector 28 includes a translucent substrate 50 (FIGS. 5 and 6), and has a deflector portion 34 and a converging portion 36 provided on the substrate 50, as indicated in FIG. 3. The laser beam radiated by the semiconductor laser element 30 and propagated through a waveguide in the substrate 50 is deflected by the deflector portion 34 through an acoustooptical or electro-optical effect known in the art. The deflected laser beam is then converged by the converging portion 36, so that the beam is focused at a desired point away from the deflector 28, that is, on the surface of the drum 10. The semiconductor laser element 30 is attached to one end of the deflector 28 on the side of the deflector portion 34. The acoustooptical effect is a phenomenon in which a light beam is diffracted by an object in response to a periodic change in refractive index thereof, which occurs when the object is exposed to an acoustic or elastic wave of a periodically varying frequency. On the other hand, the electro-optical effect is a phenomenon in which a light beam is refracted according to a variation in refractive index of an electro-optical material which occurs locally in the crystal structure, according to a variation in the magnitude of an electric field to which the material is exposed.

The frequency at which the laser beam is deflected by the optical deflector 28, and the generation (emission and absence) of the laser beam by the semiconductor laser element 30, are controlled by the previously indicated printing control system 32 which is provided usually in the form of a computer. The control system 32 receives from a main control computer print signals representative of desired images such as letters and symbols which are printed on the recording medium 22.

Figure 4:
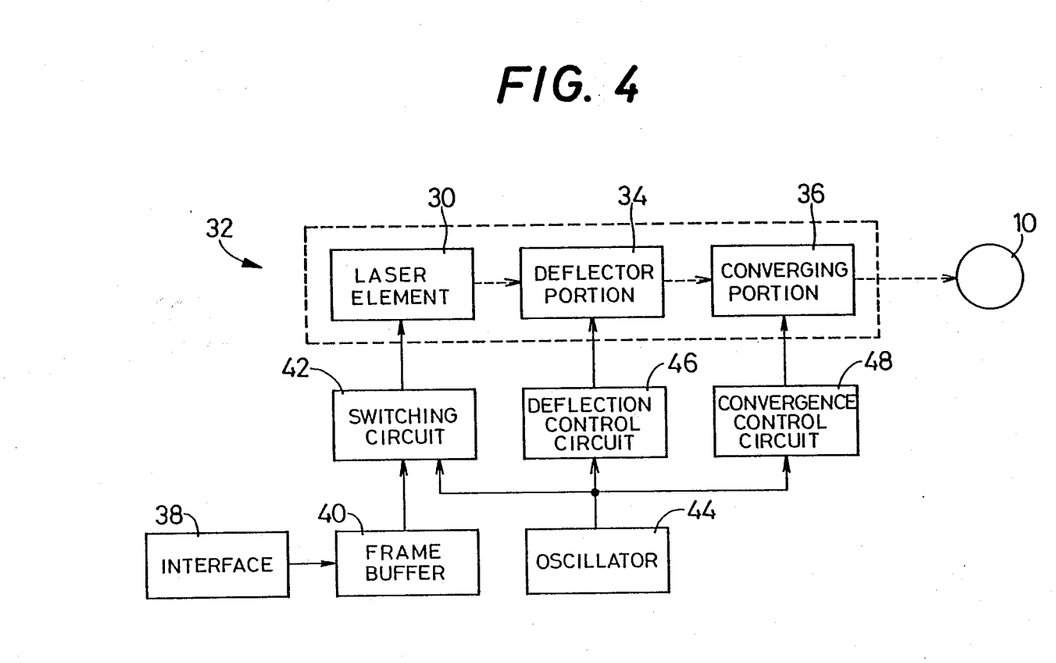
FIG. 4 is a schematic block diagram of a printing control system of the laser printer of FIG. 1.

An example of the printing control system 32 is shown in FIG. 4, which includes a frame buffer 40 for storing print signals which are received from an interface 38. The control system 32 further includes a switching circuit 42 for controlling the ON-OFF operation of the semiconductor laser element 30, a deflection control circuit 46 for controlling the operation of the deflector portion 34 of the deflector 28, and a convergence control circuit 48 for controlling the operation of the converging portion 36 of the deflector 28. The switching circuit 42 is operated in synchronization with signals generated by an oscillator 44, to turn on and off the laser element 30, according to the print signals stored in the buffer 40, so that an image represented by the print signals is reproduced on the photoconductive surface of the drum 10. The deflection control circuit 46 is also operated in synchronization with the signals from the oscillator 44, to regulate the frequency or level of a voltage to be applied to the deflector portion 34, so that the surface of the drum 10 is swept or scanned by the laser beam radiated by the laser element 30. The convergence control circuit 48, also operable in synchronization with the signals from the oscillator 44, is operated to adjust the level of a voltage to be applied to the converging portion 36, so that the deflected laser beam is focused on the surface of the drum 10.

The optical deflector 28 will be described in detail, referring to FIGS. 5 and 6, wherein the substrate 50 is a rectangular electro-optical chip which has a thickness of about 0.5 mm and which is made of a suitable electro-optical material such as crystals of $LiNbO_3$. As shown in FIG. 6, a waveguide 52 is formed adjacent to one of opposite surfaces of the substrate 50. The waveguide 52 is provided in the form of a thin layer that has a higher refractive index than the electro-optical material of the substrate 50. The higher refractive index of this thin layer causes the waves of a light beam to be trapped in the direction of thickness of the waveguide 52, whereby the waves of the light beam are properly guided or conducted through the waveguide 52. For example, the layer of the waveguide 52 is formed, with a comparatively small thickness of several microns, by diffusion of a suitable material such as Ti (titanium) through the skin portion of the substrate 50. The substrate 50 and the layer of the waveguide 52 are integral parts of each other, and the refractive index is varied continuously across the interface or boundary of the substrate 50 and the waveguide layer. The boundary is indicated in broken line in FIG. 6.

The semiconductor laser element 30 is attached to one end of the substrate 50 such that the laser element 30 is coupled to the corresponding end of the waveguide 52, to introduce a laser beam into the waveguide 52. The laser radiation from the end of the laser element 30 is condensed into parallel rays while passing through a condenser portion 56 formed in the waveguide 52, near the laser element 30. The parallel rays are then passed through the deflector portion 34, so that the rays are deflected, as described later in detail. The thus deflected parallel rays are then converged by the converging portion 36, i.e., focused on the surface of the drum 10.

Described more specifically, the condenser portion 56 is formed parallel to the surface of the substrate 50, so as to extend perpendicularly to an optical axis Lo of the laser beam, by means of diffusion of a suitable material such as titanium, such that the diffusion density or the concentration of the diffused material is increased in opposite directions toward the optical axis Lo. In other words, the refractive index of the condenser portion 56 in the waveguide 52 is increased in the directions toward the optical axis Lo. The thus formed condenser portion 56 functions as a convex lens. Successive straight lines indicated at 56 in FIG. 5 represent the condenser portion 56. The density of the straight lines represents the distribution of the refractive index. While the condenser portion 56 is formed as described above, it may be replaced by other means such as a geodesic lens provided in the form of a concave cavity formed in the surface of the waveguide 52.

The deflector portion 34 and the converging portion 36 are formed on a buffer layer 62 formed on the waveguide 52. The buffer layer 62 is a layer of several microns which is made of a transparent material such as $SiO_2$ having a lower refractive index than the material of the waveguide 52. The buffer layer 62 is provided for preventing electrodes (which will be described) of the deflector and converging portions 34, 36 from absorbing the energy of the laser light passing through the waveguide 52. However, the buffer layer 62 may be eliminated.

The deflector portion 34, which is provided to deflect the laser beam at varying angles, comprises a pair of deflection electrodes 64, 66, and another deflection electrode 68. The electrodes 64 and 66 are disposed in parallel on both sides of the optical axis Lo such that the electrodes 64, 66 are spaced a suitable distance from the optical axis Lo. The third deflection electrode 68 has an extension which obliquely extends between the first and second deflection electrodes 64, 66 so as to intersect the optical axis Lo, as shown in FIG. 5.

Figures 7, 8:
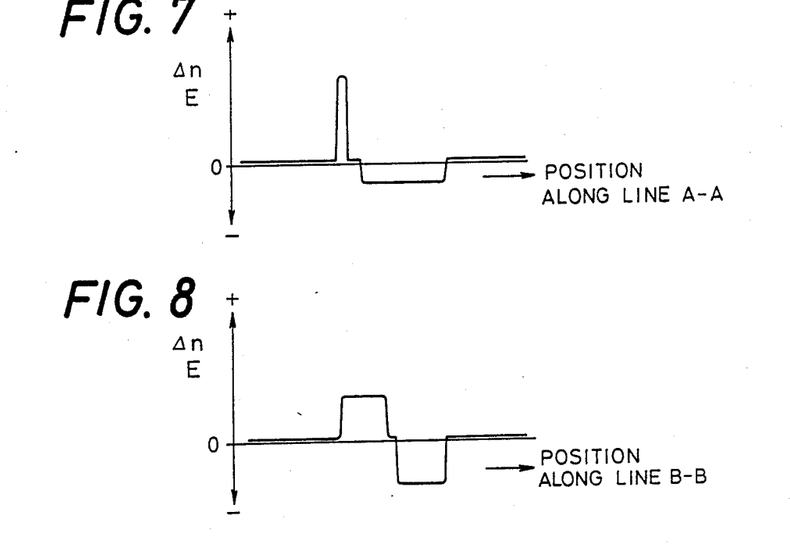
FIGS. 7, 8 and 9 are graphical representations showing distributions of electric field (variation in refractive index of a deflector portion), taken along lines A—A, B—B and C—C of FIG. 5, respectively.
Figure 9:
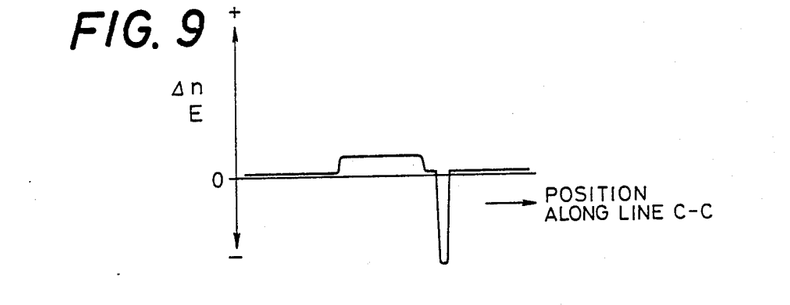

Generally, an electro-optical material has a property (electro-optical effect) of changing its refractive index according to a variation in the magnitude of an electric field to which the material is exposed. If the substrate 50 of the deflector 28 is made of $LiNbo_3$(Y-cut crystal), a variation $\Delta n$ in refractive index at the portion of the waveguide 52 located between the deflection electrodes 64, 66 in the direction perpendicular to the optical axis Lo is expressed by the following formula (1):

$$\Delta n = (\tfrac{1}{2})n_e^3 r_{33} \cdot E \qquad (1)$$

where,
  $n_e$: refractive index of the substrate 50 with respect to abnormal light
  $r_{33}$: electro-optical constant of the substrate 50 in the direction of thickness Namely, the distribution of the refractive index, i.e., the distribution of the refractive index variation $\Delta n$ in the above direction, is changed with the distribution of a magnitude of an electric field E produced at the portion between the two electrodes 64, 66. For example, when a positive voltage is applied to the electrode 68, while an earth voltage is applied between the pair of electrodes 64, 66, the electric field E and the refractive index variation $\Delta n$ at positions A—A, B—B and C—C of the deflector portion 34 have the distributions as indicated by the graphs of FIGS. 7, 8 and 9, respectively. In this condition, therefore, the rays of laser light transmitted parallel to the optical axis Lo are subject to different average refractive indexes while passing through the deflector portion 34. Namely, the rays passing nearest to the electrodes 64 and 66 experience, for example, the lowest and highest refractive indexes, respectively. Thus, the flux of the laser rays is deflected on one side of the optical axis L0 which is higher in refractive index than the other side.

In the arrangement indicated above, the deflection voltages to be supplied by the control circuit 46 to the electrode 68, and to the electrodes 64, 66, are varied as a function of time, for example, following a sine curve. As a result, the angle of deflection l of the laser beam by the deflector portion 34 is accordingly varied in synchronization with the variation in the deflection voltages applied to the deflection electrodes 64, 66, 68. In connection with the graphical representations in FIGS. 7-9, it is noted that the positions along lines A—A, B—B and C—C are viewed in the direction from the converging portion 36 toward the condenser portion 56, and that the positive side of the electric field E corresponds to the lower side of the optical axis Lo as seen in FIG. 5.

Figure 10:
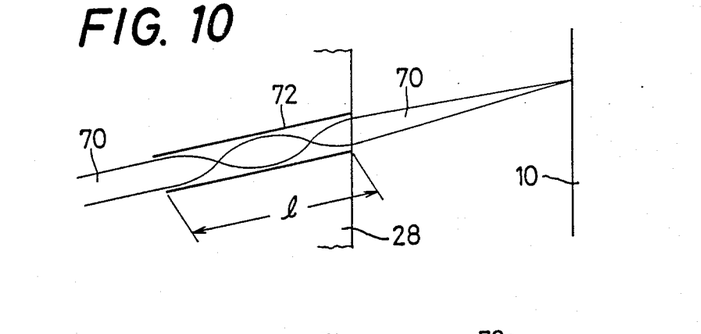
FIG. 10 is an illustration indicating propagation of a laser beam through a converging portion of the optical deflector of FIG. 5.

The converging portion 36 comprises a radial array of multiple three-dimensional waveguides 72 which are disposed radially so that a laser beam 70 (FIG. 10) of a given angle of deflection with respect to the optical axis Lo may be transmitted through the appropriate waveguides 72. The length l of each waveguide 72 is determined so that the laser beam 70 may be focused at a point on the surface of the drum 10 of the laser printer. The waveguides 72 are disposed so as to cover a predetermined angular range over which the laser beam is deflected by the deflector portion 34. The converging portion 36 further comprises multiple convergence electrodes 74 which consist of the electrodes aligned with the respective waveguides 72, and the electrodes which are located outside of the radial array of the waveguides 72 and near the outermost electrodes aligned with the outermost waveguides 72. While only seven waveguides 72 are shown in FIG. 5 for easy understanding, there are actually a large number of the waveguides 72.

Figure 11:
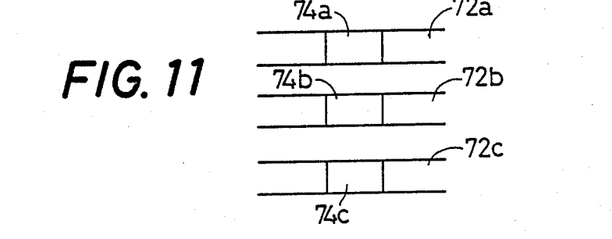
FIG. 11 is a view for explaining the operation of electrodes of the converging portion.
Figure 12:
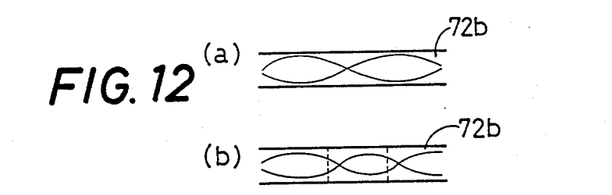
FIG. 12 is a view for explaining the operation of the converging portion, indicating at (a) and (b) the states in which a voltage is applied and not applied to the electrodes, respectively.
Figure 13:
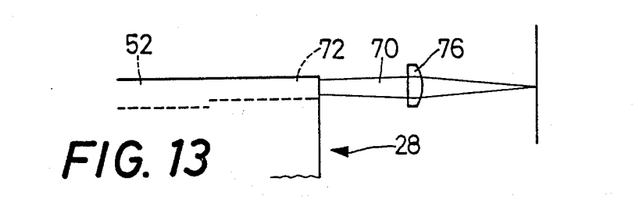
FIG. 13 shows an example of a toroidal lens disposed on the output side of the deflector of FIG. 5.

The three-dimensional waveguides 72 are formed by diffusion of a suitable material such as titanium, such that the refractive index of the converging portion 36 is increased toward the optical axis Lo, toward the center of the radial array. The laser beams 70 transmitted through the appropriate waveguides 72 are converged at different points on the surface of the drum 10, which points are shifted along a line, according to a change in the angle of deflection of the light by the deflector portion 34. In order to converge the laser rays 70 from each waveguide 72 on the surface of the drum 10, a convergence voltage is applied between the appropriate convergence electrodes 74. Stated more specifically referring to FIG. 11, when the laser ray 70 from the waveguide 72b is converged on the drum 10, a convergence voltage is applied between the convergence electrodes 74a and 74c which are adjacent to the convergence electrode 74b which is aligned with the waveguide 72b. As a result, the refractive index at the portion of the waveguide 72b which is located between the electrodes 74a and 74c is varied, whereby the laser ray 70 is changed from the state of (a) in FIG. 12 to the state of (b) in the same figure. In this manner, the ray of the laser light from the waveguide 72b is focused or concentrated at the surface of the drum 10. For this purpose of adjusting the focal length of the waveguides 72, the convergence control circuit 48 is operated to cyclically supply voltage signals to the appropriate pairs of the convergence electrodes 74. The voltage signals are determined depending upon the specific angles of deflection of the light obtained by the deflector portion 34. As illustrated in FIG. 13, it is possible to use a toroidal lens 76 for accomplishing vertical focusing of the laser rays 70 from the converging portion 72.

In the optical deflector 28 constructed as described above, the rays of the laser light from the condenser portion 56 are deflected by the deflector portion 34, by utilizing the electro-optical effect of the electro-optical material which forms the waveguide 52. Further, the angle of deflection of the light by the deflector portion 34 is changed by changing the deflection voltages to be applied to the deflection electrodes 64, 66, 68, as a function of time, so as to vary the distribution of the refractive index in the direction perpendicular to the optical axis Lo. Hence, the instant deflector 28 does not include any mechanical moving parts such as a rotary unit and a drive for operating the rotary unit as used in the conventional apparatus. Accordingly, the instant optical system 12 using the deflector 28 is improved in terms of operating noise, operating reliability and durability.

Further, the optical deflector 28 is constructed compact, since the condenser portion 56, deflector portion 34 and converging portion 36 are integrated as a unit on the single substrate 50, whereby the size and weight of the optical system 12 as a whole are reduced.

Figure 14:
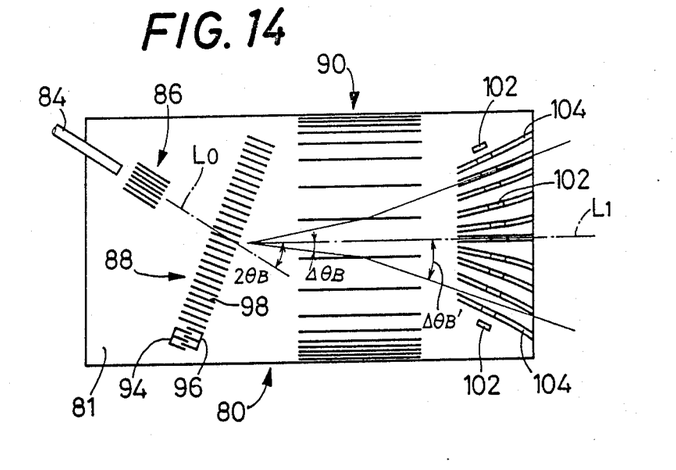
FIGS. 14 and 15 are a plan and a side elevational view, respectively, corresponding to FIGS. 5 and 6, showing a further embodiment of an optical deflector of the present invention.
Figure 15:
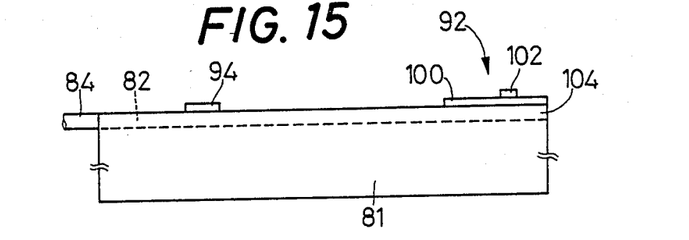

While the optical system 12 uses the optical deflector 28 which has been described, the optical system 12 may be modified to use an optical deflector 80 as illustrated in FIGS. 14 and 15.

This modified optical deflector 80 includes a rectangular substrate 81 which has a thickness of about 0.5 mm and is made of an electro-optical material such as a crystal of LiNbO$_3$. On one surface of the substrate 81, a thin layer of titanium is formed to provide a waveguide 82 similar to the waveguide 52 previously described. However, the substrate 81 may be made of other electro-optical materials, or may be replaced by a thin layer of an electro-optical material such as LiNbO$_3$ formed on a base made of LiTaO$_3$ or SiO$_2$ which demonstrates a very low or no electro-optical effect. Further, the waveguide 82 formed by diffusion of titanium through the skin portion of the substrate 81 may be formed of other metallic materials such as vanadium (V), niobium (Nb) and copper (Cu).

As a light source, an optical fiber 84 is coupled to one end of the waveguide 82. The laser rays radiated from the end of the optical fiber 84 are condensed into parallel rays by a condenser portion 86, and deflected by a deflector portion 88. The deflected laser rays are further deflected by a deflection-amplifying portion 90, before they are converged by a converging portion 92.

Figure 5:
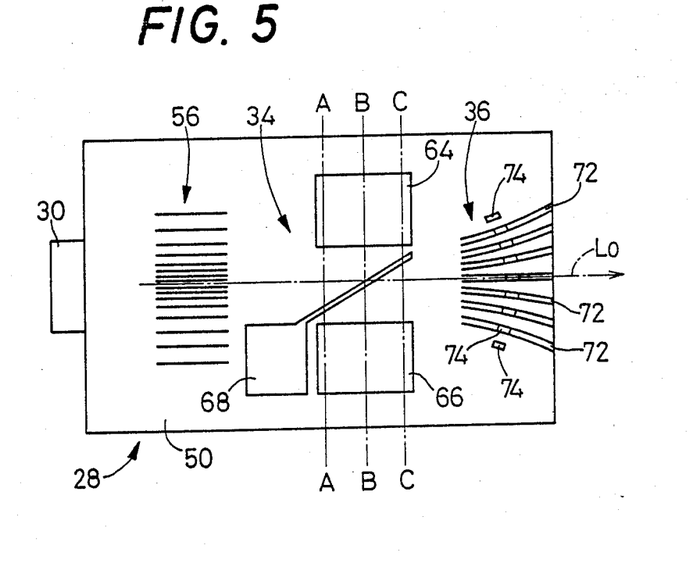
FIGS. 5 and 6 are a plan view and a side elevational view of the optical deflector of FIG. 3.
Figure 6:
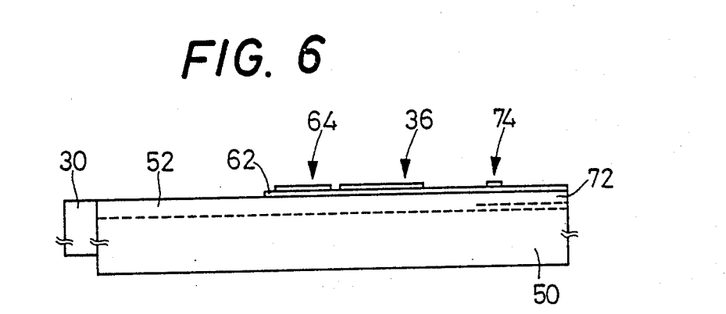
Figure 16:
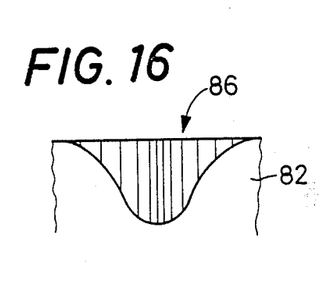
FIGS. 16 and 17 are fragmentary views in cross section illustrating arrangements of the condenser and converging portions of FIG. 14, respectively.

Like the condenser portion 56 of FIG. 5, the condenser portion 86 of the present embodiment is formed by diffusion of a suitable material such as titanium, such that the diffusion density or the concentration of the diffused material is increased in opposite directions toward the optical axis Lo. In other words, the refractive index of the condenser portion 86 in the waveguide 82 is increased in the direction toward the optical axis Lo, as indicated in FIG. 16. The thus formed condenser portion 86 functions as a convex lens. While the variation in the refractive index of the condenser portion 86 is actually not perceived, the vertical parallel lines are given in FIG. 16 for indicating the distribution of the refractive index.

The deflector portion 88 uses a pair of comb-like deflection electrodes 94, 96. Upon exitation of the electrodes 94, 96, elastic surface waves 98 (ultrasonic waves) are generated from the electrodes 94, 96, whereby the refractive index of the deflector portion 88 in the waveguide 82 is periodically varied in the direction intersecting the optical axis Lo. When a laser beam is passed through the ultrasonic field, the laser beam is diffracted due to Bragg diffraction. More particularly stated, an angle of diffraction $2\theta_B$ of the laser beam due to the Bragg diffraction is obtained from the following formula (2):

$$2\theta_B = \lambda n \Lambda \quad (2)$$

where,
$\lambda$: wavelength of laser beam
n: refractive index in waveguide 82
$\Lambda$: wavelength of elastic surface waves.

When a frequency of a voltage to be applied to the comb-like electrodes 94, 96 is changed by $\Delta f$, an angle of deflection of the laser beam is changed by $\Delta\theta_B$ which is obtained from the following formula (3):

$$\Delta\theta_B \approx \lambda \cdot \Delta f / v \quad (3)$$

where, v: propagation velocity of elastic surface waves. Although the elastic surface waves 98 are actually invisible, they are indicated in FIG. 14 for easy understanding. In the present embodiment wherein the substrate 81 is made of LiNbO$_3$, that is a piezo-electric element, the elastic surface waves 98 are produced when a deflection voltage is applied to the comb-like electrodes 94, 96. However, the comb-like electrodes 94, 96 may be replaced by a PZT, ZnO or other ultrasonic oscillator disposed at the edge of the substrate 81. While the deflector portion 88 is adapted to diffract the laser beam according to Bragg diffraction, it is possible to utilize the principle of Raman-Nath diffraction.

Figure 17:
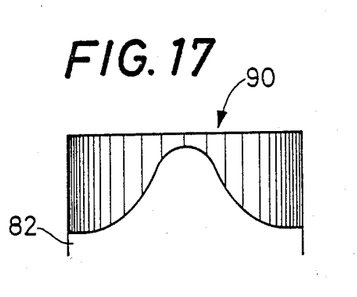

The deflection-amplifying portion 90 is formed by diffusion of a suitable material such as titanium (Ti) through the substrate 80, such that the diffusion density or the concentration of the diffused material is increased in opposite directions away from an axis L1 which is aligned with a center of the angular range within which the laser beam is deflected by the deflector portion 88. In this arrangement, the refractive index of the deflection-amplifying portion 90 in the waveguide 82 is increased in the directions away from the axis L1, as indicated in FIG. 17. Therefore, the deflection-amplifying portion 90 serves as a concave lens. Consequently, the deflection angle $\Delta\theta_B$ at the deflector portion 88 is amplified to $\Delta\theta_B'$ by the deflection-amplifying portion 90. In connection with FIG. 17, the vertical parallel lines are provided merely for indicating the distribution of the refractive index of the deflection-amplifying portion 90.

The converging portion 92 uses multiple pairs of convergence electrodes 102 which are disposed on a buffer layer 100. As in the converging portion 36 of the preceding embodiment, controlled voltages are applied to these convergence electrodes 102, so that the laser beams transmitted through respective waveguides 104 are focused on the surface of the drum 10 of the laser printer.

According to the optical deflector 80 arranged as described above, the laser beam radiated from the optical fiber 84 and introduced into the waveguide 82 is condensed into parallel rays by the condenser portion 86, and is deflected by a total angle of $\Delta\theta_B'$ by the deflector portion 88 and the deflection-amplifying portion 90. The focal point of the thus deflected laser beam is adjusted by the converging portion 92 so that the laser beam is focused on a specified point on the surface of the drum 12, irrespective of the angle of deflection of the beam by the deflector portion 88. In this arrangement, the laser beam spot is moved on the drum 10 by changing the deflection angle of the laser beam by the deflector portion 88 and the deflection-amplying portion 90, whereby the photoconductive surface of the drum 10 is scanned or swept by the laser beam.

Like the preceding embodiment, the present embodiment using the deflector 80 does not incorporate any mechanical moving parts as used in the conventional counterpart, and is therefore improved in terms of operating noise reliability, and durability. Further, the deflector 80 is compact and lightweight, since its condenser portion 86, deflector portion 88, deflection-amplifying portion 90 and converging portion 92 are provided on the single substrate 81.

Although the deflector 28 or 80 uses the deflector portion 34, 88 utilizing an electro-optical or acoustooptical effect to deflect a laser beam, it is possible that the optical system 12 of the laser printer may use a deflector which utilizes a acoustooptical effect. In this case, the deflector includes a heat-generating element for establishing a temperature gradient, to deflect a laser beam according to a distribution of refractive index corresponding to the established temperature gradient.

While the present invention has been described in its preferred embodiments for illustrative purpose only, it is to be understood that the invention is not confined to the precise disclosure contained herein, but may be embodied with various changes, modifications and improvements which may occur to those skilled in the art, without departing from the spirit and scope of the invention defined in the appended claims.

What is claimed is:

1. A laser-beam printer comprising a photosensitive medium and an optical system which includes a laser source generating a laser beam and an optical deflector for deflecting the laser beam over a predetermined angular range, said photosensitive medium being exposed to a linear sweep of the laser beam and thereby given an image pattern, wherein said optical deflector comprises (a) a single substrate which has a waveguide formed therein for guiding said laser beam generated by said laser source, (b) a deflector portion provided on said substrate for deflecting the laser beam which is propagated through said waveguide, so as to cause the laser beam to scan said photosensitive medium over said predetermined angular range, and (c) a converging portion which includes a plurality of mutually spaced-apart convergence electrodes disposed on said waveguide, to converge the deflected laser beam from said deflector portion; and wherein said optical system further includes control means comprising a deflection control circuit for controlling an operation of said deflector portion so as to deflect the laser beam from said laser source to scan said photosensitive medium over said predetermined angular range, and a convergence control circuit operated in synchronization with said deflection control circuit for applying convergence voltages to said convergence electrodes, said convergence voltages being varied as a function of time, depending upon an angle of deflection of said laser beam by said deflector portion, to adjust a focal length of said converging portion according to said angle of deflection, so that the deflected laser beam is converged on said photosensitive medium irrespective of said angle of deflection.

2. A laser-beam printer according to claim 1, wherein said optical deflector further comprises a condenser portion provided in said waveguide for condensing a radiation of said laser beam from said laser source into parallel rays which are deflected by said deflector portion.

3. A laser-beam printer according to claim 1, wherein said optical deflector further comprises a deflection-amplifying portion, disposed between said deflector portion and said converging portion, for amplifying the angle of deflection of said laser beam by said deflector portion, said deflection-amplifying portion being constituted by a portion of said waveguide whose refractive index is varied so that said portion of the waveguide serves as a concave lens.

4. A laser-beam printer according to claim 1, wherein said laser source comprises a semiconductor laser element in the form of a chip.

5. A laser-beam printer according to claim 1, wherein said substrate is made of an electro-optical material having an electro-optical effect, and said deflector portion comprises a plurality of deflection electrodes which are disposed on a portion of said waveguide in spaced-apart relation with each other in a direction intersecting a direction of propagation of said laser beam through said waveguide, and wherein said deflection control circuit applies deflection voltages to said deflection electrodes to produce an electric field for establishing a distribution of a refractive index of said portion of said waveguide in a transverse direction of said waveguide, said distribution of the refractive index corresponding to a distribution of a magnitude of said electric field due to said electro-optical effect, said deflection control circuit changing said deflection voltages as a function of time, thereby deflecting said laser beam within said predetermined angular range.

6. A laser-beam printer according to claim 1, wherein said deflector portion comprises an oscillator for generating elastic surface waves to which a portion of said waveguide is exposed, and wherein said deflection control circuit periodically changes a frequency of said elastic surfaces waves to effect a periodic variation in refractive index of said portion of the waveguide, in timed relation with said frequency of said elastic waves, whereby an angle of deflection of said laser beam by said deflector portion is varied with the frequency of said elastic surface waves.

7. A laser-beam printer according to claim 6, wherein said substrate is formed by $LiNbO_3$, and said oscillator comprises comb-like electrodes disposed on said substrate.

8. A laser-beam printer according to claim 3, wherein said deflection-amplifying portion is formed by diffusion of a metallic material through a part of one of opposite surfaces of said substrate which is located between said condenser portion and said converging portion and which extends across said waveguide, so that said part has a refractive index which decreases in opposite transverse directions of said waveguide, toward a centerline of said waveguide, so as to provide a concave lens.

9. A laser-beam printer according to claim 1, wherein said substrate is made of an electro-optical material having an electro-optical effect, and said converging portion comprises a radial array of a plurality of three-dimensional waveguides which are disposed radially so as to cover said predetermined angular range, said convergence electrodes being arranged such that portions of said three-dimensional waveguides are exposed to electric fields which are produced by the convergence electrodes by application of said convergence voltages thereto, said convergence voltages being varied to change magnitudes of said electric fields and thereby change distributions of refractive indexes of said portions of said three-dimensional waveguides due to said electro-optical effect, whereby said laser beam emitted from said three-dimensional waveguides is focussed on said photosensitive medium.

10. A laser-beam printer comprising a drum with a photoconductive surface and an optical system which includes a laser source generating a laser beam and an optical deflector for deflecting the laser beam over a predetermined angular range, said photoconductive surface being exposed to a linear sweep of the laser beam and thereby given an electrostatic image pattern to be transferred onto a surface of a recording medium,
  wherein said optical deflector comprises (a) a single substrate which has a waveguide formed therein for guiding said laser beam generated by said laser source, said waveguide comprising a thin layer formed by diffusion of a metallic material through one of opposite surfaces of said substrate, said thin layer having a higher refractive index than said substrate so as to trap the laser beam within said waveguide in a direction of thickness of said thin layer, thereby guiding the laser beam through said waveguide, (b) a deflector portion provided on said substrate for deflecting the laser beam which is propagated through said waveguide, so as to cause the laser beam to scan said photoconductive surface of said drum over said predetermined angular range, (c) a condenser portion provided in said waveguide for condensing a radiation of said laser beam from said laser source into parallel rays which are deflected by said deflector portion, and (d) a converging portion comprising a plurality of mutually spaced-apart convergence electrodes disposed on said waveguide, to converge the deflected parallel rays from said deflector portion; and
  wherein said optical system further includes control means comprising a convergence control circuit for applying convergence voltages to said convergence electrodes, said convergence voltages being varied as a function of time to adjust a focal length of said converging portion according to an angle of deflection of said parallel rays by said deflector portion, so that the deflected parallel rays are converged on said photoconductive surface of said drum irrespective of said angle of deflection.

11. A laser-beam printer comprising a drum having a photoconductive surface and an optical system which includes a laser source generating a laser beam and an optical deflector for deflecting the laser beam over a predetermined angular range, said photoconductive surface being exposed to a linear sweep of the laser beam and thereby given an electrostatic image pattern to be transferred onto a surface of a recording medium,
  wherein said optical deflector comprises (a) a single substrate which has a waveguide formed therein for guiding said laser beam generated by said laser source, (b) a deflector portion provided on said substrate for deflecting the laser beam which is propagated through said waveguide, so as to cause the laser beam to scan said photoconductive surface of said drum over said predetermined angular range, (c) a condenser portion provided in said waveguide for condensing a radiation of said laser beam from said laser source into parallel rays which are deflected by said deflector portion, said condenser portion being formed by diffusion of a metallic material though a part of one of opposite surfaces of said substrate which extends across said waveguide, so that said part has a refractive index which increases in opposite transverse directions of said waveguide, toward a centerline of said waveguide, so as to provide a convex lens, and (d) a converging portion comprising a plurality of mutually spaced-apart convergence electrodes disposed on said waveguide, to converge the deflected parallel rays from said deflector portion; and
  wherein said optical system further includes control means comprising a convergence control circuit for applying convergence voltages to said convergence electrodes, said convergence voltages being varied as a function of time to adjust a focal length of said converging portion according to an angle of deflection of said parallel rays by said deflector portion, so that the deflected parallel rays are converged on said photoconductive surface of said drum irrespective of said angle of deflection.

12. A laser-beam printer comprising a photosensitive medium and an optical system which includes a laser source generating a laser beam and an optical deflector for deflecting the laser beam over a predetermined angular range, said photosensitive medium being exposed to a linear sweep of the laser beam and thereby given an image pattern,
  wherein said optical deflector comprises (a) a single substrate which has a waveguide fromed therein for guiding said laser beam generated by said laser source, (b) a deflector portion provided on said substrate for deflecting the laser beam which is propagated through said waveguide, so as to cause the laser beam to scan said photosensitive medium over said predetermined angular range, (c) a deflection-amplifying portion for amplifying the angle of deflection of said laser beam by said deflector portion, said deflection-amplifying portion being constituted by a portion of said waveguide whose refractive index is varied so that said portion of the waveguide serves as a concave lens, and (d) a converging portion comprising a plurality of mutually spaced-apart convergence electrodes disposed on said waveguide, to converge the deflected laser beam from said deflection-amplifying portion; and
  wherein said optical system further includes control means comprising a deflection control circuit for controlling an operation of said deflector portion so as to deflect the laser beam from said laser source so that a total angle of deflection of the laser beam by said deflector portion and said deflection-amplifying portion covers said predetermined angular range, and a convergence control circuit operated in synchronization with said deflection control circuit.

* * * * *